(12) United States Patent
Yun

(10) Patent No.: US 6,809,456 B2
(45) Date of Patent: *Oct. 26, 2004

(54) VECTOR MOTOR

(76) Inventor: Jae Shin Yun, Samic Ceramic Apt. 909, 184 Gil 2-Dong, Kangdong-Ku, Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 10/315,130

(22) Filed: Dec. 10, 2002

(65) Prior Publication Data

US 2003/0102754 A1 Jun. 5, 2003

Related U.S. Application Data

(63) Continuation-in-part of application No. 09/778,715, filed on Feb. 8, 2001, now Pat. No. 6,504,285.

(51) Int. Cl.[7] .................. H02K 21/12; H02K 21/24; H02K 1/00
(52) U.S. Cl. ........................... 310/261; 310/193
(58) Field of Search .................. 310/261, 216, 310/193, 156.48, 156.49, 156.34, 156.36, 217–218

(56) References Cited

U.S. PATENT DOCUMENTS

| | | |
|---|---|---|
| 127,369 A | 5/1872 | Richardson |
| 788,291 A | 4/1905 | Titzel |
| 2,108,662 A | 2/1938 | Fisher |
| 2,145,791 A | 1/1939 | Gille |
| 2,538,216 A | 1/1951 | Stehlik |
| 3,118,138 A | 1/1964 | Milas et al. |
| 3,389,281 A | 6/1968 | Ellis |
| 3,700,942 A | 10/1972 | Alth |
| 4,206,374 A | 6/1980 | Goddijn |
| 4,358,693 A * | 11/1982 | Palmer et al. ............. 310/46 |
| 4,995,627 A | 2/1991 | Yun |
| 5,064,212 A | 11/1991 | Yun |
| 5,233,251 A * | 8/1993 | Nehmer .................. 310/167 |
| 5,410,200 A | 4/1995 | Sakamoto et al. |
| 5,481,147 A * | 1/1996 | Kaplan et al. ............ 310/181 |
| 5,505,490 A | 4/1996 | Yun |
| 5,514,923 A * | 5/1996 | Gossler et al. ............ 310/74 |
| 5,585,680 A | 12/1996 | Tsoffka |
| 5,739,612 A | 4/1998 | Davenport |
| 5,763,976 A | 6/1998 | Huard |
| 5,783,890 A * | 7/1998 | Mulgrave ............ 310/156.43 |
| 5,923,111 A * | 7/1999 | Eno et al. ............. 310/156.25 |
| 5,936,322 A * | 8/1999 | Yamaguchi et al. ... 310/156.19 |
| 6,013,963 A * | 1/2000 | Shelton, Jr. ............ 310/179 |
| 6,147,428 A * | 11/2000 | Takezawa et al. ..... 310/156.57 |
| 6,198,194 B1 | 3/2001 | Vyas |
| 6,353,275 B1 * | 3/2002 | Nishiyama et al. .... 310/156.53 |

FOREIGN PATENT DOCUMENTS

| | | |
|---|---|---|
| DE | 4107784 | 9/1992 |
| FR | 600658 | 2/1926 |

(List continued on next page.)

*Primary Examiner*—Tran Nguyen
(74) *Attorney, Agent, or Firm*—Birch, Stewart, Kolasch & Birch, LLP

(57) ABSTRACT

A motor employing vector motion principles to Convert magnetic forces into rotary motion has a rotor with a shaft and a plurality of magnets connected to the shaft by bent supports having a particular bend angle. The rotor is positioned within a stator having a plurality of stator magnets opposing the rotor magnets. Magnetic force, such as a repelling or attracting force between the rotor and stator is formed in a non-radial direction due to the orientation of the rotor magnets mounted on bent supports and their opposing stator magnets. One segment of the bent support receives an action force from the magnetic force between the stator magnet and the rotor magnet. Another segment of the bent support exhibits a reaction force opposing the action force. The vectors of the action force and the reaction force combine into a resultant vector having a direction that induces rotor rotation.

13 Claims, 5 Drawing Sheets

FOREIGN PATENT DOCUMENTS

| | | |
|---|---|---|
| FR | 2568067 | 1/1986 |
| GB | 1142591 | 2/1969 |
| GB | 2019110 | 10/1979 |
| IT | 565627 | 8/1957 |
| JP | 56112887 | 5/1981 |
| JP | 6216051 | 1/1987 |
| JP | 363202252 * | 6/1987 .............. 31/156.38 |
| JP | 6469275 | 3/1989 |
| JP | 374165 | 3/1991 |
| JP | 4372567 | 12/1992 |

* cited by examiner

VECTOR MOTOR

PRIORITY

This continuation-in-part application claims priority under 35 U.S.C. §120 on U.S. patent application Ser. No. 09/778,715, filed in the U.S. Patent and Trademark Office on Feb. 8, 2001 now U.S. Pat. No. 6,504,285, the entirety of which is herein incorporated by reference.

BACKGROUND OF THE INVENTION

1. Field of the Invention

The present invention relates to a motor utilizing vector motion principles. In particular, the motor according to the present invention generates power by converting magnetic forces into vector motion, and then using the vector motion to rotate a rotor shaft of a motor.

2. Description of the Background Art

Motors driven by the attraction or repulsion forces of magnets are well known. Among the many components of a motor, the basic elements include a stator and a rotor that rotates therein. The stator has magnets mounted in circumferentially spaced relation. The rotor can have electromagnetic units mounted in circumferentially spaced relation around the rotor axis of rotation. Each electromagnet unit has a core member and windings around the core member. By applying current to the electromagnetic units, an electromagnetic lever force is applied to the rotor. The electromagnetic units can be energized to provide a magnetic repelling driving force or a magnetic attracting driving force. The rotor and stator orientations can be monitored so that the electromagnetic units are properly pulsed upon alignment of the rotor magnets and stator magnets to generate opposing magnetic forces therebetween for driving the rotor. Also, if the rotor and stator magnets are not aligned, a device to initiate rotation for starting the motor can be included. Additional elements and components of a motor will not be described, but would be understood by those skilled in the art to be inclusive of motor designs.

In the background art, the stator magnets and the rotor magnets are oriented in a radial manner with respect to the rotor axis of rotation. As such, the magnetic forces acting between the stator magnets and the rotor magnets are also generally formed in a radial direction from the rotor axis of rotation. The magnetic attracting or repelling driving forces formed between the stator and rotor magnets result in a lever force being applied to the rotor to allow rotation thereof.

SUMMARY OF THE INVENTION

A feature of the present invention is the recognition by the inventor of the advantages in employing vector motion for motor power generation. In particular, the inventor recognized the advantages of applying vector motion in operating a motor. The inventor of the present invention recognized the disadvantages of the radial orientation of the stator magnets and rotor magnets, whereby the magnetic forces acting therebetween are not effectively transferred to rotary motion. By employing vector motion in transferring magnetic forces to rotary force, more efficient and effective motor power generation can be obtained.

The motor according to the present invention employs the concepts of vector motion in converting magnetic forces into rotary motion. The motor comprises a rotor and a stator with at least a set of rotor magnets and opposing stator magnets. As the rotor rotates, the rotor magnets move into successive alignment with the opposing stator magnets so that magnetic forces (attraction or repulsion) are applied to the rotor for rotation thereof. In particular, the rotor magnets are connected to the rotor shaft on bent supports. Each bent support has a reaction segment that extends radially from the rotor shaft, and an action segment disposed at an angle to the reaction segment. Preferably, the action segment and the reaction segment are at an angle of 90 degrees. In one embodiment, a set of four rotor magnets are positioned at 90 degree intervals around the rotor shaft. Also, there is a set of four stator magnets positioned at 90 degree intervals that oppose the rotor magnets. additionally, there can be multiple sets of rotor magnets and stator magnets. Each set of rotor and stator magnets can be staggered to allow the rotor to rotate more smoothly.

BRIEF DESCRIPTION OF THE DRAWINGS

The present invention will become more fully understood from the detailed description given herebelow and the accompanying drawings, which are given by way of illustration only, and thus are not limitative of the present invention.

DESCRIPTION OF THE PREFERRED EMBODIMENTS

The present invention will hereinafter be described with reference to the accompanying drawings. The motor according to the present invention employs the concepts of vector motion in converting magnetic force into rotational force. The theoretical principles of vector motion are well known, but applying vector motion principles to motor design has not been employed prior to the present invention.

Vectors and vector motion are known concepts in mathematics and physics. In particular, diagonal vectors, in contrast to horizontal or vertical vectors, are useful in analyzing the motion of objects. Nature also takes advantage of vector motion. It can be observed that the bones of animals, particularly animals that can travel at high speeds, are well suited for generating high speed motion. For example, the front and rear portions of a cheetah have a bone structure appropriate for generating high speed. In animals such as the cheetah, the scapula and humerus of its front portion, and the pelvis and femur of its rear portion are formed to be at an angle relative to the horizontal ground, and have approximately a 90 degree angle therebetween. The bone structure of animals can be analyzed using vectors. A resultant vector is formed at a junction point where two vectors meet. The two vectors may both have a direction going towards a junction point or a direction going away from the junction point. In either case, a resultant vector exists at the junction point. For the cheetah, the scapula and the humerus apply a force of equal magnitude in a direction towards the joint therebetween, because of its body weight due to gravity. Similarly, the pelvis and femur apply forces to the joint therebetween. The resulting vectors at both joint portions have a direction pointing forward, and thus provide a natural forward momentum for the animal.

Such vector motion concepts can also be employed in improving mechanical objects of motion. For example, U.S. Pat. Nos. 4,995,627, 5,064,212, and 5,505,490, all issued to the inventor of the present invention, disclose examples of employing vector configurations to improve vehicle structures, the entirety of each of which are hereby incorporated by reference. The present invention takes advantage of vector configurations for improving motor power generation.

The motor of the present invention includes a rotor and a stator with at least a set of rotor magnets and opposing stator magnets. Additional elements and components of a motor will not be described so that the features of the present invention will not be obscured. However, such additional elements and components would be understood by those skilled in the art to be inclusive of the present invention.

Figure 1:
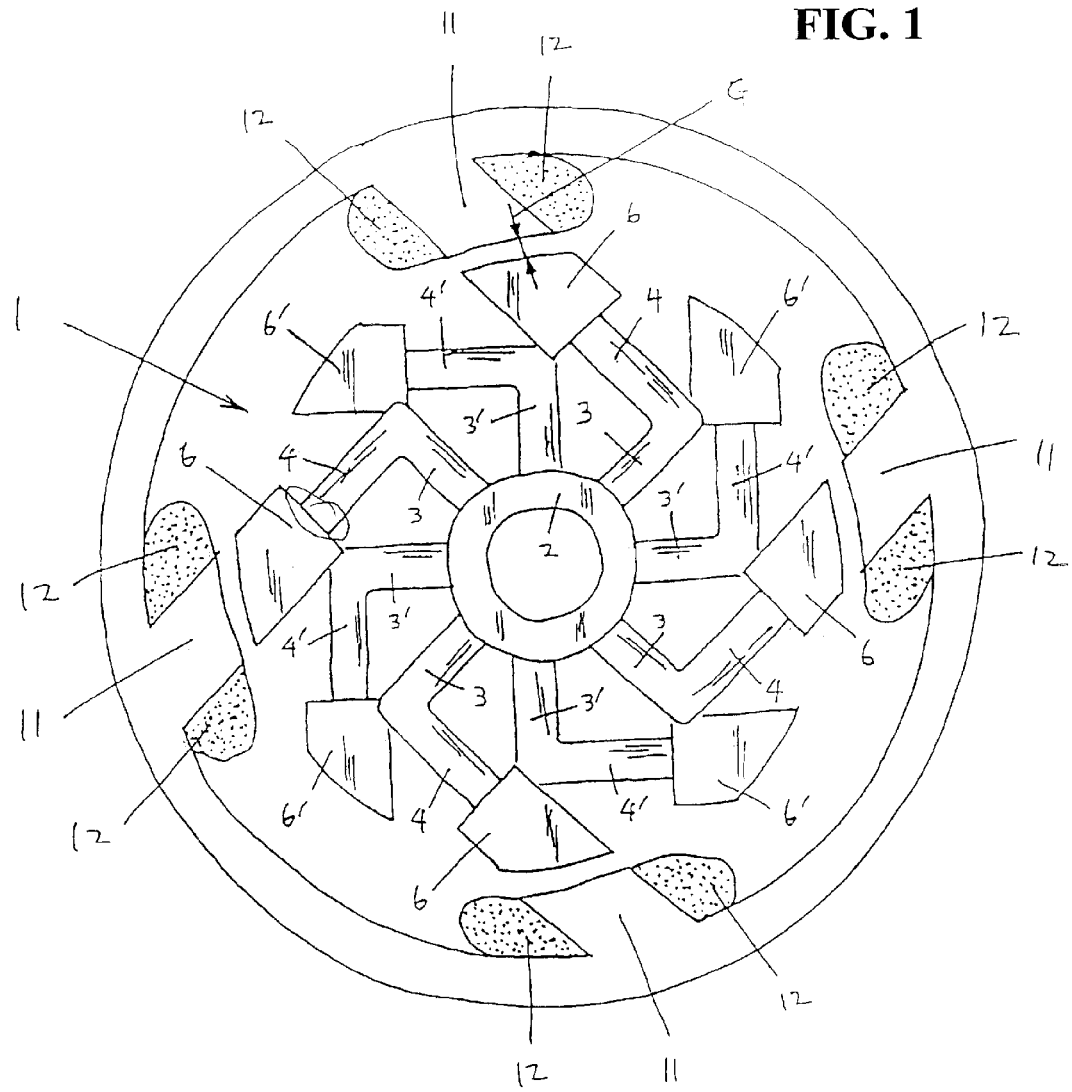
FIG. 1 is a view showing a motor having a stator and a rotor therein along the axis of rotation of the rotor shaft according to one embodiment of the present invention.

FIG. 1 depicts the basic elements of a motor having a rotor 1 positioned within a stator 10. The stator 10 can be made of metal, e.g., silicon steel, formed to have a cylindrical shape, allowing the rotor 1 to rotate therein. The stator 10 has a plurality of stator magnets, e.g., first stator magnets 11 and second stator magnets 11' (shown only in FIG. 5, but underneath the first stator magnets 11) formed at predetermined locations thereon. In the embodiment of FIG. 1, the stator 10 also has coils 12 wound around each stator magnet 11, 11' to form electromagnets.

The rotor 1 has a shaft 2 in the shape of a hollow cylinder allowing the rotor 1 to rotate. A plurality of rotor magnets (first rotor magnets 6 and second rotor magnets 6') are formed around predetermined locations of the shaft 2. The rotor magnets 6, 6' can be formed to have a wedge shape to allow the rotor 1 to rotate by the magnetic forces between the rotor magnets 6, 6' and stator magnets 11, 11'. The rotor magnets 6, 6' can have an outer surface with a curvature that matches the curvature of the inner surfaces of the stator 10. A gap G exists between the inner surfaces of the stator 10 and the outer portions of the rotor magnets 6, 6' to allow the rotor 1 to rotate within the stator 10 by magnetic forces acting between the stator magnets 11, 11' and the rotor magnets 6, 6'. As the rotor 1 rotates within the stator 10, the rotor magnets 6, 6' move into successive alignment with opposing stator magnets 11, 11', so that magnetic forces of attraction or repulsion are applied to the rotor 1 for continued rotation thereof. The polarities of the rotor magnets 6, 6' and the stator magnets 11, 11' can be appropriately designated and assigned depending upon the motor design and application requirements. In the embodiment shown in FIG. 1, the stator magnets 11, 11' are electromagnets and the rotor magnets 6, 6' are permanent magnets.

Figure 5:
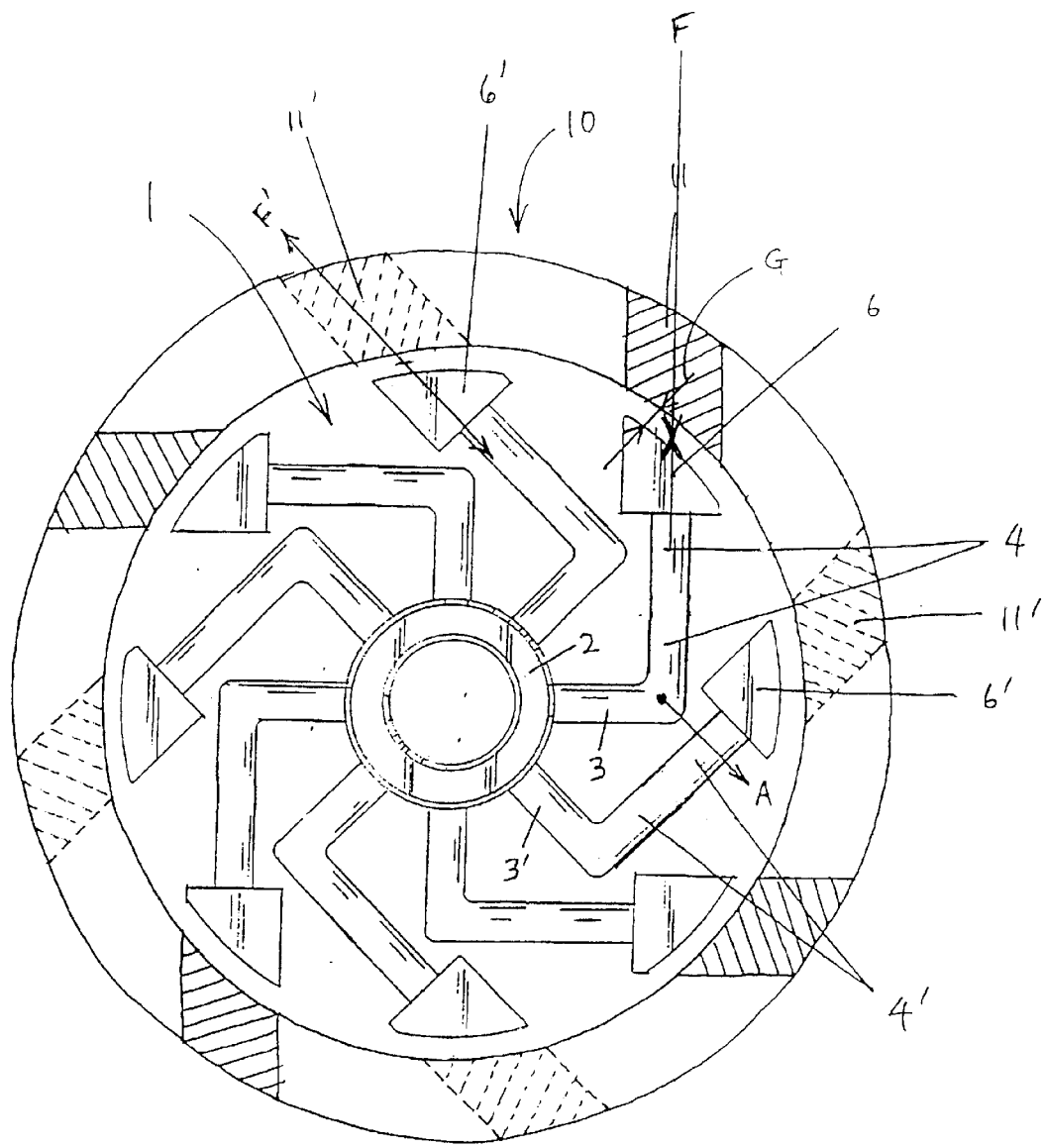
FIG. 5 is a view showing a motor having a stator and a rotor therein along the axis of rotation of the rotor shaft according to a second embodiment of the present invention.

However, one of skill in the art will appreciate that the magnets 6,6',11,11' may be any combination of electromagnets and/or permanent magnets. For example, the magnets may be arranged so that alternating forces of attraction and repulsion are created between the rotor and the stator. FIG. 5 is a view showing a motor having a stator and a rotor therein along the axis of rotation of the rotor shaft according to a second embodiment of the present invention, wherein alternating forces of attraction and repulsion may be created between the rotor and the stator.

The rotor magnets 6, 6' are connected to the rotor shaft 2 via bent supports. Each bent support has a reaction segment 3 that extends radially from the rotor shaft 2, and an action segment 4 disposed at an angle to the reaction segment 3. Preferably, the action segment 4 and the reaction segment 3 form an angle of 90 degrees. Also, the reaction segments 3 are formed around a circumference of the shaft 2.

In an exemplary embodiment of the present invention illustrated in FIG. 1, a total of eight rotor magnets 6, 6' and eight stator magnets 11, 11', (four stator magnets 11' aligned and underneath the four stator magnets 11) are employed. A first set of four rotor magnets 6 are mounted about a circumference of the rotor shaft 2 and positioned at 90 degree intervals. A second set of four rotor magnets 6' are mounted about the circumference of the shaft 2, and longitudinally offset along the shaft 2 from the first set of four rotor magnets 6. Also, referring to FIG. 1, it can be seen that the first set of rotor magnets 6 are not in radial alignment with the second set of rotor magnets 6'.

A first set of four stator magnets 11 are mounted along a circumference of the inner surface of the stator 10 and oppose the first set of rotor magnets 6. A second set of four stator magnets 11' (not shown) are mounted around the circumference of the stator 10, aligned with and underneath the first set of stator magnets 11, and oppose the second set of rotor magnets 6'. As such, each set of rotor magnets 6, 6' are 'staggered' with one another, that is, the second set of rotor magnets 6' are longitudinally offset along the shaft 2 from the first set of rotor magnets 6, and also the second set of rotor magnets 6' are not in radial alignment with the first set of rotor magnets 6. The stator magnets 11, 11' opposing the rotor magnets 6, 6' are in radial alignment with one another as shown in FIG. 1, or may be 'staggered' like the rotor magnets 6, 6'.

Figure 2:
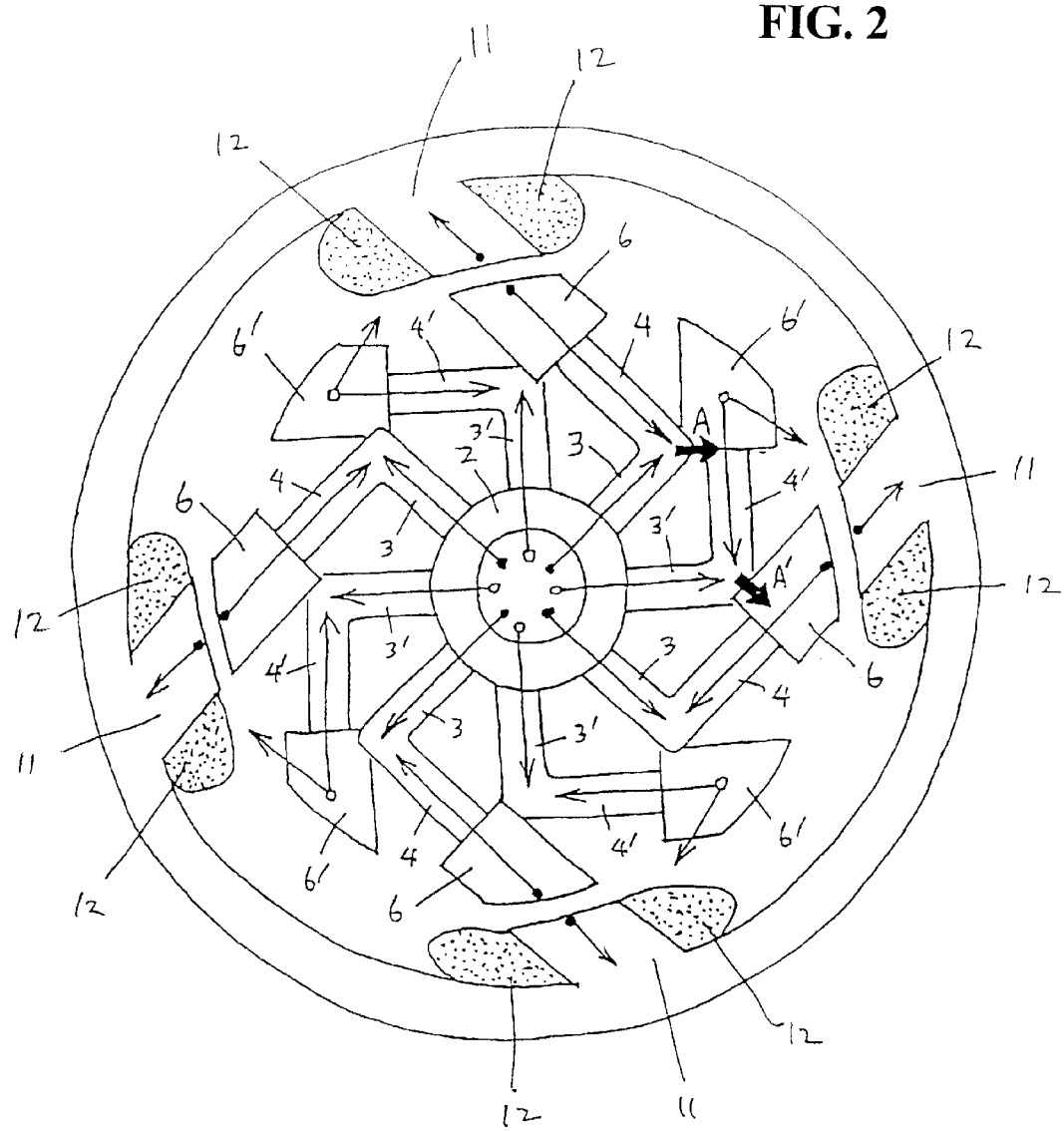
FIG. 2 shows the vector analysis between the rotor magnets and the stator magnets according to one embodiment of the present invention.

FIG. 2 shows the vector forces acting between the rotor and the stator. In the state depicted in FIG. 2, the first set of rotor magnets 6 are in line with the first set of stator magnets 11. As the rotor rotates, the second set of rotor magnets 6' will be in line with the second set of stator magnets 11' (not depicted in FIG. 2, but existing underneath the first set of stator magnets 11).

Figure 3:
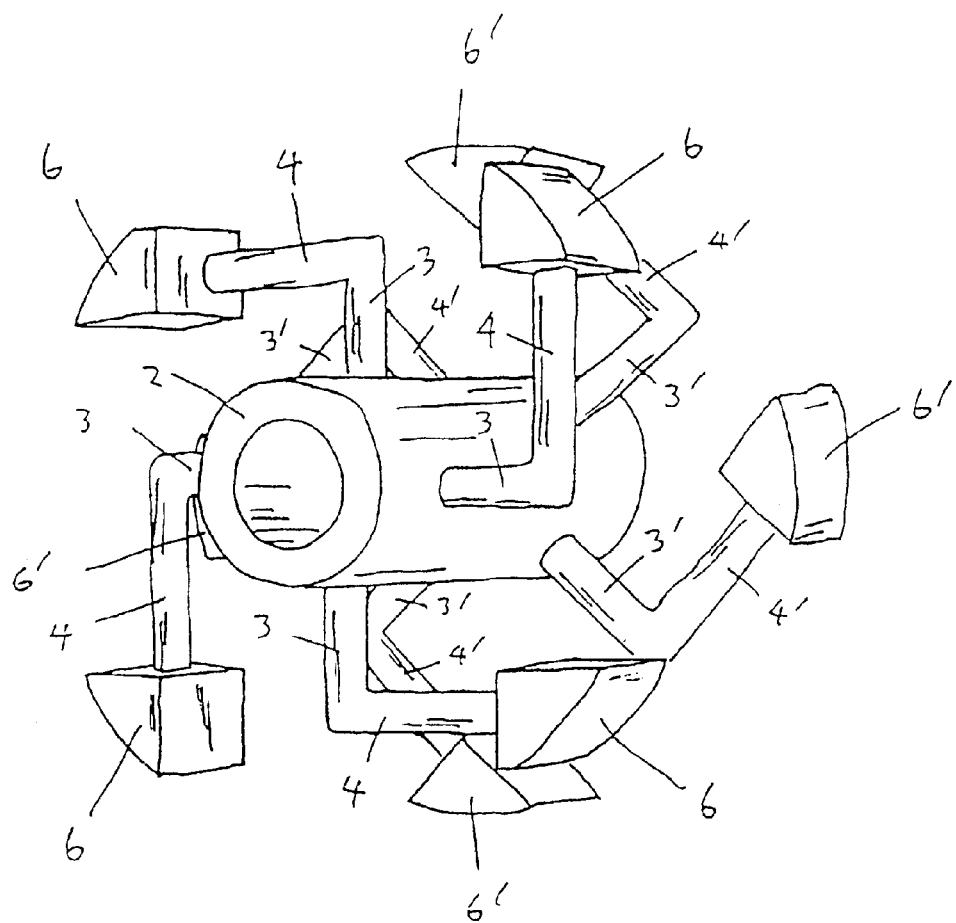
FIG. 3 is a perspective view of the rotor according to one embodiment of the present invention.

FIG. 3 shows a perspective view of the first set of rotor magnets 6 positioned about a circumference of the shaft 2, and the second set of rotor magnets 6' positioned about a circumference of the shaft 2, longitudinally offset from and not in radial alignment with the first set of rotor magnets 6. In other words, the first set of rotor magnets 6 and the second set of rotor magnets 6' are staggered so that the magnetic forces being applied to the rotor 1 is continuous, thus allowing smooth rotation thereof.

Figure 4:
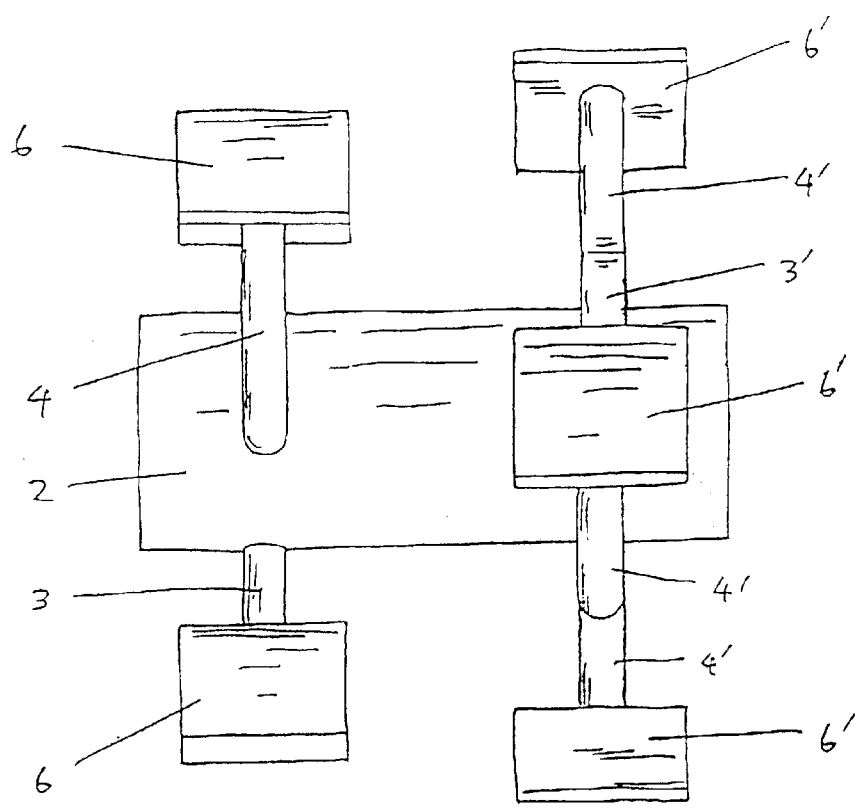
FIG. 4 is a side view of the rotor according to one embodiment of the present invention.

FIG. 4 shows a side view of the rotor 2 having the first set of rotor magnets 6 positioned about a circumference of the shaft 2, and the second set of rotor magnets 6' positioned about a circumference of the shaft 2, longitudinally offset from and not in radial alignment with the first set of rotor magnets 6. The staggered nature of the first and second sets of rotor magnets 6, 6' can be understood from FIG. 4 as well.

As seen in FIG. 5, the stator magnet 11 may be arranged to provide an attractive force to a rotor magnet 6 that is rotating toward a point of being circumferentially aligned with the stator magnet 11. Stator magnet 11' may be simultaneously arranged to provide a repulsive force, thereby providing a motive force that pushes the corresponding rotor magnet 6' away, but in the same direction of rotation of the adjacent rotor magnet 6. The alternating repulsive and attractive forces may be formed with a semi-permanent application of power to the appropriate stators or in a pulse arrangement that alters the polarity of the appropriate magnet at intervals and/or intensities, e.g., the timing and quantity of power applied to the electromagnets 11, 11' can be controlled to influence the alternating repulsive and attractive forces in variety of manners that will be appreciated by one of ordinary skill in the art.

The number of rotor magnets and stator magnets are not limited to any particular value. For example, in another embodiment, a set of more than four rotor magnets 6 can be mounted about a circumference of the rotor shaft 2 and positioned at predetermined intervals around the rotor shaft 2. More than four stator magnets 11 can be formed about a circumference of the inner surface of the stator 10 to oppose the rotor magnets 6. Similarly, another set of more than four rotor magnets 6' can be mounted about a circumference of the shaft 2, longitudinally offset from and not in radial alignment with the adjacent set of rotor magnets 6. Another set of stator magnets 11' can be formed about a circumference of the stator 10 to oppose the rotor magnets 6'. When a set of more than four rotor magnets 6 are employed, the action segment 4 and reaction segment 3 of the support for each magnet may form an angle of more than 90 degrees therebetween.

The operation of the motor according to the present invention will now be explained with reference to FIGS. 1 and 2. In one embodiment, as shown in FIGS. 1 and 2, the rotor magnets 6, 6' are preferably permanent magnets, while the stator magnets 11, 11' are preferably electromagnets. A magnetic force, e.g. magnetic attraction or repulsion, is formed between the rotor magnet 6 and the corresponding stator magnet 11 by appropriately magnetizing the the stator magnets 11, 11'. It should be noted that the rotor magnet 6, 6' and the stator magnet 11, 11' can be electromagnets, permanent magnets, or any combination thereof depending upon how the motor is to be driven.

In FIGS. 1 and 2, the first rotor magnets 6 and first stator magnets 11 are aligned with one another. At this state, the first stator magnets 11 are magnetized to have a same polarity as that of the first rotor magnets 6. As such, a magnetic repelling force between each first rotor magnet 6 and each stator magnet 11 forces the rotor 1 to rotate. Here, the magnetic repulsion force received by the rotor magnet 6 is applied to the action segment 4 of the support. An opposing mechanical repulsion force is present in the reaction segment 3 of the support, as the reaction segment is rigidly connected with the shaft 2. As shown in FIG. 2, the forces in the action segment 4 and the reaction segment 3 act together to form a resultant vector having a direction A corresponding to the rotation direction of the rotor 1. Along with the magnetic repulsion force, this resultant vector A further allows a first rotor magnet 6 to move away from its opposing first stator magnet 11. As such, the resultant vector A assists the rotor 1 to rotate.

As the rotor 1 rotates due to the magnetic repelling forces and the resultant vector forces in the action and reaction segments 4 and 3, the second stator magnets 11' (not shown but located underneath the first stator magnets 11 in FIGS. 1 and 2) are magnetized to have a polarity opposite that of the second rotor magnets 6'. As such, the second rotor magnets 6' are attracted to the second stator magnets 11'. Here, the magnetic attraction force received by the rotor magnet 6' is applied to the action segment 4' of the support. An opposing mechanical attraction force is present in the reaction segment 3' of the support, as the reaction segment is rigidly connected with the shaft 2. As shown in FIG. 2, the forces in the action segment 4' and the reaction segment 3' act together to form a resultant vector having a direction A' corresponding to the rotation direction of the rotor 1. Along with the magnetic attraction force, this resultant vector A' further allows a second rotor magnet 6' to move towards its opposing second stator magnet 11'. As such, the resultant vector A' assists the rotor 1 to rotate.

When the second rotor magnet 6' approaches and becomes aligned with the second stator magnet 11', the polarity of the second stator magnet 11' being an electromagnet, is reversed so that it becomes an opposite polarity to that of the second rotor magnet 6', which is a permanent magnet.

As subsequent rotor magnets 6, 6' approach subsequent stator magnets 11, 11' the process of obtaining a resultant vector motion is repeated, and the rotor 1 can continue to rotate. As such, magnetic repelling and attraction forces between the rotor 1 and the stator 10 are formed in a non-radial direction due to the orientation of the rotor magnets 6, 6' mounted on bent supports and their opposing stator magnets 11, 11'. One segment (e.g., an action segments 4, 4') of the bent support receives an action force from the magnetic repulsion between a first stator magnet 11 and a first rotor magnet 6, or an action force from the magnetic attraction between a second stator magnet 11' and a second rotor magnet 6'. Another segment (e.g., a reaction segment 3) of the bent support exhibits a reaction force opposing the action force. The vectors of the action force and the reaction force combine into a resultant vector having a direction that induces rotor rotation, allowing an improved and more efficient generation of rotary force and motor power generation.

More particularly, a first set of rotor magnets 6 is formed around the circumference of the shaft 2, and a second set of rotor magnets 6' being longitudinally offset from and not in radial alignment with the first set of rotor magnets 6, are formed around the circumference of the shaft. This type of staggered configuration of the rotor magnets 6 and 6' connected to the shaft 2 via bent supports (reaction segment 3 and action segment 4), allows more smooth rotation of the rotor 1, as magnetic repulsion forces are applied more frequently to the rotor 1 via the reaction and action segments 3, 4.

A rotor having bent supports, such as the rotor 1, the bent supports formed by a reaction segment 3, 3' and an action segment 4, 4', according to the present invention is advantageous over conventional rotors having radial supports. Conventional radial supports do not take advantage of resultant vector forces formed by employing bent supports connecting the rotor magnets 6, 6' to the rotor shaft 2 as in the present invention. The conventional straight structural connection between the rotor magnets and the rotor shaft result in minimal lever force being applied to the rotor. In contrast, the use of bent supports allows an improved lever force to be applied to the rotor. As a result, an electromagnetic motor in accordance with the present invention has improved rotor rotation to generate power more efficiently and effectively.

Although the embodiments described hereinabove show the action segment 4 and the reaction segment 3 being at a 90 degree angle, the particular bend angle can be of different values depending upon the particular use and application of the motor employing such segments. For example, the bend angle may be greater than 90 degrees to allow more than four rotor magnets 6 to be positioned along a particular circumference of the shaft 2.

What is described is merely illustrative of the application of the principles of the present invention. Those skilled in the art will readily recognize that these and various other modifications, arrangements and methods can be made to the present invention without strictly following the exemplary applications illustrated and described herein and without departing from the spirit and scope of the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A motor comprising:
   a stator;
   a rotor positioned within and in operable relation to the stator, the rotor having a shaft with an axis of rotation;
   a plurality of first magnetic units formed about a circumference of the shaft;
   a plurality of second magnetic units formed about the circumference of the shaft, the second magnetic units being longitudinally offset along the shaft and not in radial alignment with the first magnetic units, wherein a first attractive force is capable of being created between at least one of said first magnetic units and said stator and at least one of said second magnetic units and said stator while a first repulsive force is capable of being simultaneously created between another of said first magnetic units and said stator and another of said second magnetic units and said stator;
   a plurality of first supports connecting the first magnetic units to the shaft; and
   a plurality of second supports connecting the second magnetic units to the shaft.

2. The motor of claim 1, wherein the first magnetic units are non-radial from the axis of rotation.

3. The motor of claim 1, wherein the second magnetic units are non-radial from the axis of rotation.

4. The motor of claim 1, wherein the first support and the second support respectively have a bent portion.

5. The motor of claim 4, wherein the bent portion points toward the direction of rotation.

6. The motor of claim 5, wherein an angle of the bent portion is 90 degrees.

7. The motor of claim 1, wherein the stator comprises:
   a plurality of third magnetic units that oppose the first magnetic units of the rotor; and
   a plurality of fourth magnetic units that oppose the second magnetic units of the rotor.

8. The motor of claim 7, wherein the third magnetic units are non-radial from the axis of rotation.

9. The motor of claim 7, wherein the fourth magnetic units are non-radial from the axis of rotation.

10. The motor of claim 7, wherein at least one of the first, second, third or fourth magnetic unit comprises permanent magnets.

11. The motor of claim 7, wherein at least one of the first, second, third or fourth magnetic unit comprises electromagnets.

12. A method of driving a motor comprising:
    establishing an axis of rotation;
    receiving a combination of attractive and repulsive magnetic forces in a non-radial direction with respect to the axis of rotation;
    converting the magnetic forces into a vector motion via bent supports on the axis of rotation, the bent supports being longitudinally offset along the axis of rotation and not in radial alignment with one another; and
    outputting a rotational force onto the axis of rotation in accordance with the vector motion and the combination of attractive and repulsive magnetic forces being transferred to said axis of rotation through said bent supports.

13. A motor comprising:
    a rotor having an axis of rotation;
    a plurality of rotor supports extending from the rotor, the rotor supports being longitudinally offset along the axis of rotation and not in radial alignment with one another;
    a plurality of rotor arms disposed at an angle to the rotor supports, the rotor arms receiving a combination of attractive and repulsive magnetic forces in a non-radial direction with the axis of rotation, and the rotor supports converting the magnetic force into a vector motion; and
    a shaft outputting a rotational force onto the axis of rotation in accordance with the vector motion and the combination of attractive and repulsive magnetic forces being transferred to said axis of rotation through said bent supports.

* * * * *